Sept. 25, 1945.   G. F. VOIGT   2,385,556
NUT CRACKER
Filed May 2, 1944
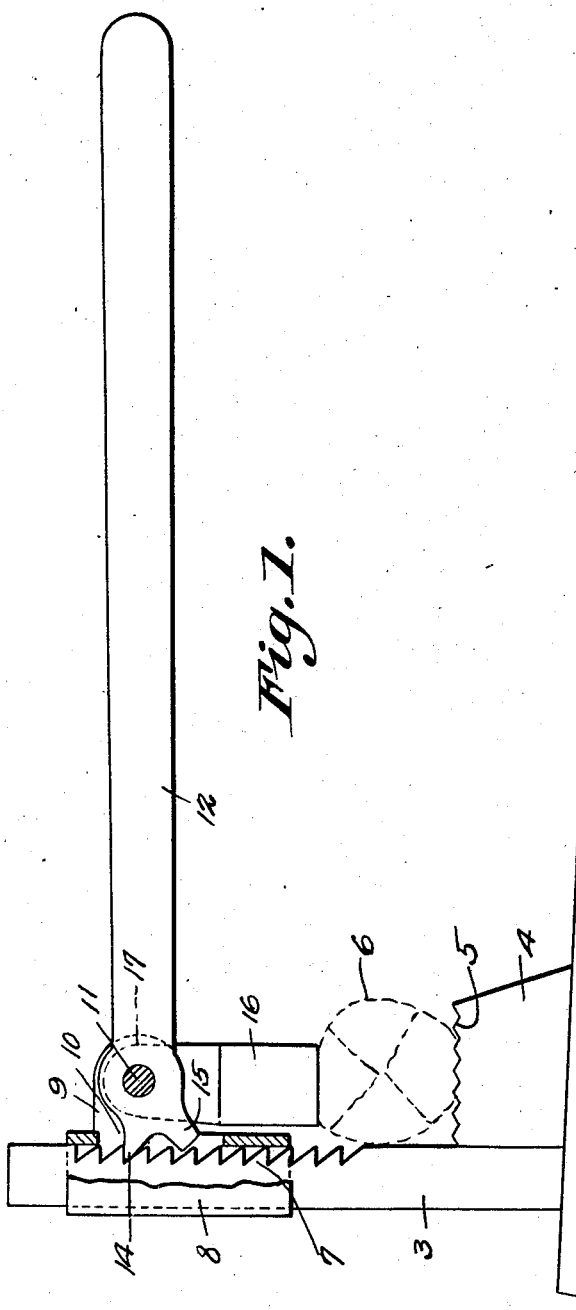
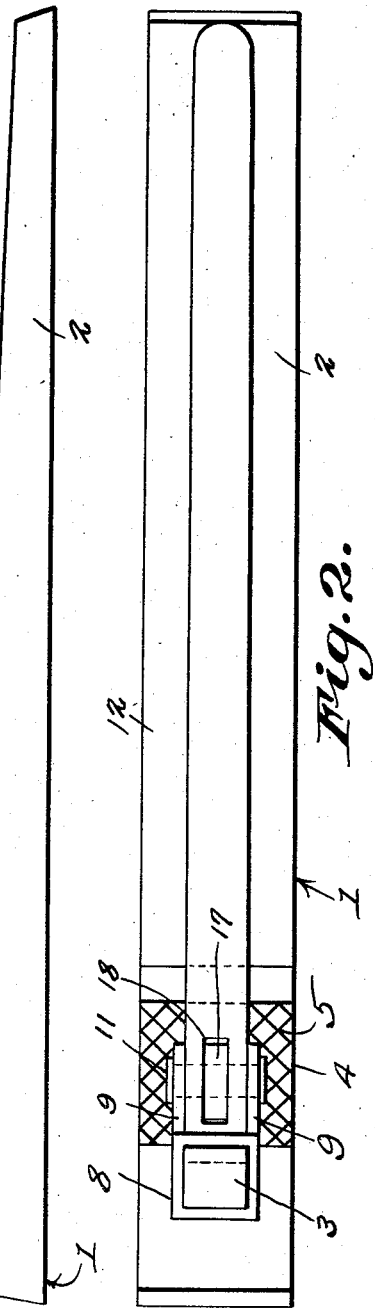
G. F. Voigt INVENTOR.
BY
ATTORNEYS.

Patented Sept. 25, 1945

2,385,556

UNITED STATES PATENT OFFICE 2,385,556

NUTCRACKER

George F. Voigt, Jeffersonville, Ind.

Application May 2, 1944, Serial No. 533,722

1 Claim. (Cl. 146—16)

The device forming the subject matter of this application is a nut cracker, and one object of the invention is to provide a device of the class described which may be adapted readily to work upon nuts of different sizes. Another object of the invention is to supply novel means for operating the hammer portion of the machine, to crack a nut. A further object of the invention is to supply novel means whereby the downward movement of the hammer will be stopped, automatically, thereby to prevent the shell of the nut from being mashed into the meat.

Within the scope of what is claimed, the structure described and shown may be changed, without departing from the spirit of the invention.

In the accompanying drawing:

Fig. 1 shows in side elevation, a device constructed in accordance with the invention, parts being broken away;

Fig. 2 is a top plan.

In carrying out the invention, there is provided a support 1, including a horizontal base 2. At a point near one end, the base 1 carries a rigid, upright standard 3 which, preferably, is of polygonal cross section.

An anvil block 4 is fitted in the angle defined by the standard 3 and the base 2 and is connected to one or both of the parts specified. The upper surface of the anvil 4 is roughened, as shown at 5, so as to obtain a good hold upon the nut 6 which is to be cracked. On one edge, the standard 3 is supplied with a longitudinal rack 7.

The numeral 8 designates a tubular rider, mounted for vertical reciprocation on the standard 3. The rider 8 conforms, in cross section, to the cross section of the standard 3, and, therefore, the rider cannot rotate upon the standard. The rider 8 is provided with rearwardly extended ears 9, and there is an opening in the rider, between the ears, the opening being designated by the numeral 10. The ears 9 of the rider 8 carry a fulcrum pin or pivot element 11.

The numeral 12 designates a lever, mounted on the fulcrum pin 11, between the ears 9, to swing vertically. The lever 12 is provided at its working end with an actuating finger 14, extended through the opening 10, and adapted to cooperate with the rack 7. Below the actuating finger 14, the lever 12 carries a projecting, blunt stop 15, which extends through the opening 10. The stop 15 is spaced slightly from the finger 14, vertically considered.

The numeral 16 marks a hammer, adapted to cooperate with the anvil 4 in the cracking of the nut. The hammer 16 is provided at its upper end with a reduced fin 17, pivotally mounted on the fulcrum element 11, and received in an opening 18 formed in the lever 12.

The lever 12 may be swung to a substantially vertical, upstanding position, thereby to free the actuating finger 14 from the rack 7 of the standard 3. The tubular rider 8 then may be adjusted vertically, depending upon the size of the nut 6. The lever 12 then is swung downwardly, substantially to the position of Fig. 1, the finger 14 cooperating with the rack 7 to force the hammer 16 downwardly and effect a cracking of the nut. As the lever 12 is swung downwardly, the stop 15 engages one of the teeth of the rack 7 and the downward movement of the hammer 16 is terminated. Owing to this construction, the nut 6 is not mashed, to drive the shell of the nut into the meat thereof.

Owing to the fact that the standard 3 is of polygonal cross section, the rider 8 being of a like cross section, and being incapable of rotation on the standard 3, the hammer 16 at all times is disposed above the anvil 4, and is in a position to cooperate with the anvil in the cracking of a nut.

It will be clear from the drawing, that the device, although simple in construction, affords an increased leverage and pressure on a nut, it being possible to bring about a cracking of the nut, even though the appliance is used by a person having small strength.

I claim:

A nut cracker comprising a horizontal base, an anvil carried by the base, an upright standard secured to the base and having a rack, a rider mounted to slide along the standard, a lever having means for engaging the rack, a hammer disposed above the anvil, and a pivot element carried by the rider, the pivot element constituting a fulcrum for the lever and forming a suspension member whereon the hammer is hung movably, and a stop extending from the lever, said stop being spaced below the rack-engaging means of the lever and adapted to engage the rack, limiting downward movement of the lever.

GEORGE F. VOIGT.